N. DOWNES.
Water Cooler.
No. 46,646
Patented Mar. 7, 1865.
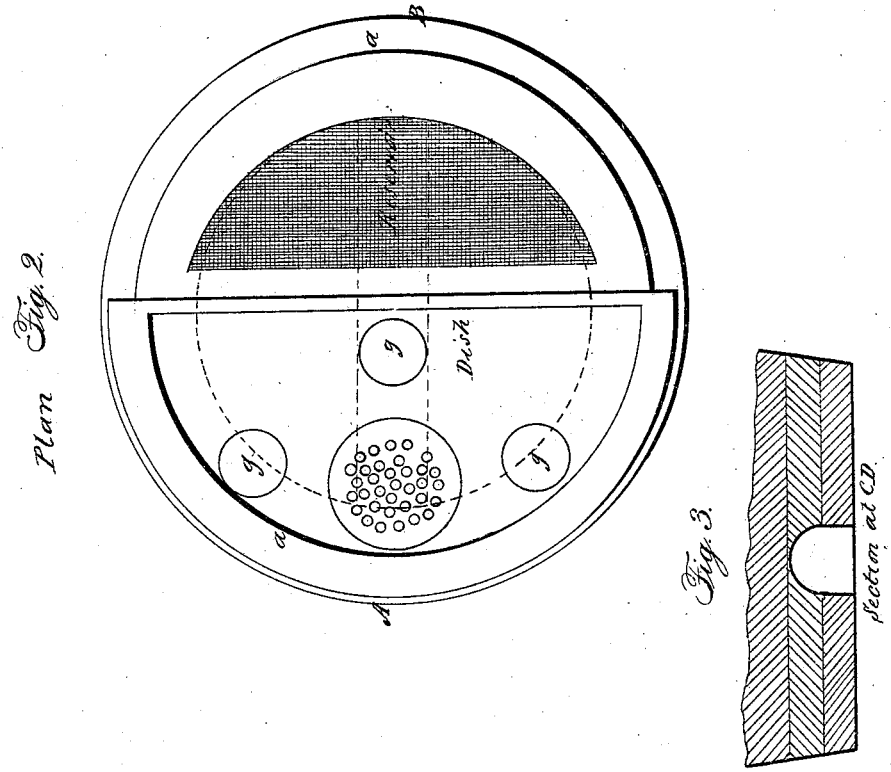
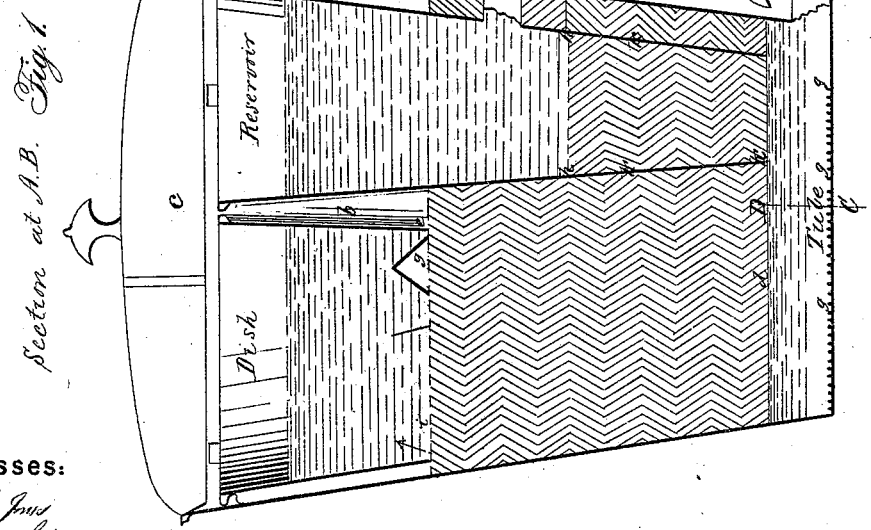
Witnesses:
Inventor:

UNITED STATES PATENT OFFICE.

NICHOLAS DOWNES, OF SYRACUSE, NEW YORK.

IMPROVEMENT IN WATER-FILTERS.

Specification forming part of Letters Patent No. 46,646, dated March 7, 1865; antedated February 27, 1865.

*To all whom it may concern:*

Be it known that I, N. DOWNES, of Syracuse, in the county of Onondaga and the State of New York, have invented certain new and useful Improvements in Water-Filters; and I do hereby describe and ascertain my said invention, referring to the accompanying drawings, in which—

Figure 1 is a sectional elevation on the line A B of Fig. 2. Fig. 2 is a plan. Fig. 3 is a transverse section of the bottom of the filter on the line C D of Fig. 1.

My improvements consist in the novel arrangement and combination of parts composing the filter, by means of which a filter, water-cooler, &c., is made in a compact form that has a downward and upward filter through the filtering medium, and affords an ample means of cleansing the same, a space for ice-cooling, and an ample reservoir for the cool filtered water for ready use.

The construction is as follows: I form an outer case or vessel, $a\ a$, of cylindrical or other convenient shape, into which I pack the filtering medium, of whatever description, up to the line $e\ e$. (See Fig. 1.) Into the space above this filtering medium I place a vessel or "dish," which fills a space about half the diameter of the outer vessel, $a$, with its bottom resting on the filtering medium at $e\ e$. In the space opposite this there is permanently affixed to the vessel $a\ a$ "reservoir," the bottom of which extends down some distance below the filtering medium to the line $h\ h$. From the lower part of this reservoir there is a faucet, $f$, through which the water in the reservoir is drawn for use. All around the reservoir there is a space, $b\ b$, that serves to keep it cool, and a large double cover, $c$, closes the top of the exterior vessel, $a$. The dish is made removable, but rests on the filtering medium when in place. It has on its bottom three or more conical projections upward, as at $g$, on which the ice is made to rest, and there is an opening through the bottom at $i$ surrounded by a flange or rim, into which sponge is inserted, and through which the water from the dish passes to the filtering medium. The bottom of the reservoir is furnished with a perforated bottom at $h\ h$, through which the filtered water flows into it from the bottom of the reservoir. There is a partition, $k$, which extends down nearly to the bottom, dividing the filtering medium into two parts, connected only at the bottom. A semi-cylindrical tube extends across the outer vessel, $a$, from one side to the other on the bottom, its flat side being downward, as clearly seen in cross-section at Fig. 3, and longitudinal section, Fig. 1, where a row of small holes, $s$, are seen at its lower part. A faucet, $t$, forms an outlet from this tube, that, when open, will draw the water from the interior down through the filtering medium to cleanse it.

When water to be filtered is put into the dish, it descends through the filtering medium $x\ x$ to the bottom, and thence rises within the partition $k\ k$, through the filtering medium $y\ y$, and into the reservoir through its perforated bottom at $h\ h$, where it is ready to be drawn for use.

Having thus fully described my improved filter, what I claim, and desire to secure by Letters Patent, is—

The combination of the ice-dish, reservoir, partition $k$, and tube for cleansing with the filtering medium, as and for the purposes set forth.

NICHOLAS DOWNES.

Witnesses:
THOS. L. PINCKNEY,
GEO. W. GRAY.